(12) United States Patent
Park et al.

(10) Patent No.: US 9,585,110 B2
(45) Date of Patent: Feb. 28, 2017

(54) METHOD FOR TRANSMITTING AND RECEIVING UPLINK SIGNALS, AND APPARATUS THEREFOR

(71) Applicant: LG ELECTRONICS INC., Seoul (KR)

(72) Inventors: Jonghyun Park, Anyang-si (KR); Yunjung Yi, Anyang-si (KR); Kijun Kim, Anyang-si (KR); Byounghoon Kim, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/391,674

(22) PCT Filed: Apr. 29, 2013

(86) PCT No.: PCT/KR2013/003673
§ 371 (c)(1),
(2) Date: Oct. 9, 2014

(87) PCT Pub. No.: WO2013/165138
PCT Pub. Date: Nov. 7, 2013

(65) Prior Publication Data
US 2015/0063317 A1    Mar. 5, 2015

Related U.S. Application Data

(60) Provisional application No. 61/639,971, filed on Apr. 29, 2012.

(51) Int. Cl.
*H04W 56/00* (2009.01)

(52) U.S. Cl.
CPC ... *H04W 56/0005* (2013.01); *H04W 56/0045* (2013.01)

(58) Field of Classification Search
None
See application file for complete search history.

(56) References Cited

U.S. PATENT DOCUMENTS

2012/0115539 A1* 5/2012 Zhang .............. H04W 56/0045
455/524
2012/0218988 A1* 8/2012 Xu .................... H04W 56/0045
370/350

(Continued)

FOREIGN PATENT DOCUMENTS

WO   WO /2010/105568    * 9/2010

OTHER PUBLICATIONS

LG Electronics, "Multiple TA in UL CoMP," 3GPP TSG WG1 Meeting #66bis, R1-113283, Oct. 2011, 3 pages.

(Continued)

*Primary Examiner* — Mohammad Adhami
(74) *Attorney, Agent, or Firm* — Lee Hong Degerman Kang & Waimey

(57) ABSTRACT

The present invention relates to a method for transmitting an uplink signal in a wireless communication system. The method includes the steps of: transmitting an uplink signal in a first uplink transmitting timing period determined on the basis of a first timing advance command received from a first serving cell; and, when a specific condition is satisfied, transmitting an uplink signal in a second uplink transmitting timing period determined on the basis of a second timing advance command.

6 Claims, 7 Drawing Sheets

(56) References Cited

U.S. PATENT DOCUMENTS

| | | | | |
|---|---|---|---|---|
| 2012/0243514 A1* | 9/2012 | Wu | ................... | H04W 74/0833 |
| | | | | 370/336 |
| 2013/0010711 A1* | 1/2013 | Larsson | ............ | H04W 56/0005 |
| | | | | 370/329 |
| 2013/0077569 A1* | 3/2013 | Nam | ................... | H04W 52/288 |
| | | | | 370/328 |
| 2013/0195086 A1* | 8/2013 | Xu | ........................ | H04W 72/04 |
| | | | | 370/336 |
| 2014/0219185 A1* | 8/2014 | Etemad | ................ | H04L 5/0091 |
| | | | | 370/329 |

OTHER PUBLICATIONS

Texas Instruments, "Timing Advance in support of UL CoMP," 3GPP TSG RAN WG1 #66bis, R1-113247, Oct. 2011, 3 pages.

Texas Instruments, "Support of Multiple Timing Advance Commands," 3GPP TSG RAN WG1 #66, R1-112153, Aug. 2011, 3 pages.

Huawei, et al., "Uplink timing advance for CoMP," 3GPP TSG RAN WG1 Meeting #68bis, R1-120991, Mar. 2012, 4 pages.

PCT International Application No. PCT/KR2013/003673, Written Opinion of the International Searching Authority dated Aug. 9, 2013, 20 pages.

\* cited by examiner

METHOD FOR TRANSMITTING AND RECEIVING UPLINK SIGNALS, AND APPARATUS THEREFOR

CROSS-REFERENCE TO RELATED APPLICATIONS

This application is the National Stage filing under 35 U.S.C. 371 of International Application No. PCT/KR2013/003673, filed on Apr. 29, 2013, which claims the benefit of U.S. Provisional Application Ser. No. 61/639,971, filed on Apr. 29, 2012, the contents of which are hereby incorporated by reference herein in their entirety.

TECHNICAL FIELD

The present invention relates to a wireless communication system and, more particularly, to methods for transmitting and receiving uplink signals, and apparatuses therefor.

BACKGROUND ART

Recently, various devices requiring machine-to-machine (M2M) communication and high data transfer rate, such as smartphones or tablet personal computers (PCs), have appeared and come into widespread use. This has rapidly increased the quantity of data which needs to be processed in a cellular network. In order to satisfy such rapidly increasing data throughput, recently, carrier aggregation (CA) technology that efficiently uses more frequency bands, cognitive ratio technology, multiple input multiple output (MIMO) technology for increasing data capacity in a restricted frequency, multiple-base-station cooperative technology, etc. have been highlighted. In addition, communication environments have evolved such that the density of accessible nodes is increased in the vicinity of a user equipment (UE). Here, a node includes one or more antennas and refers to a fixed point capable of transmitting/receiving radio frequency (RF) signals to/from the user equipment (UE). A communication system including high-density nodes may provide a communication service of higher performance to the UE by cooperation between nodes.

A multi-node coordinated communication scheme in which plural nodes communicate with a user equipment (UE) using the same time-frequency resources has much higher data throughput than legacy communication schemes in which each node operates as an independent base station (BS) to communicate with the UE without cooperation.

A multi-node system performs coordinated communication using a plurality of nodes, each of which operates as a base station or an access point, an antenna, an antenna group, a remote radio head (RRH), and a remote radio unit (RRU). Unlike the conventional centralized antenna system in which antennas are concentrated at a base station (BS), nodes are spaced apart from each other by a predetermined distance or more in the multi-node system. The nodes can be managed by one or more base stations or base station controllers which control operations of the nodes or schedule data transmitted/received through the nodes. Each node is connected to a base station or a base station controller which manages the node through a cable or a dedicated line.

The multi-node system can be considered a kind of Multiple Input Multiple Output (MIMO) system since dispersed nodes can communicate with a single UE or multiple UEs by simultaneously transmitting/receiving different data streams. However, since the multi-node system transmits signals using dispersed nodes, a transmission area covered by each antenna is reduced compared to antennas included in the conventional centralized antenna system. Accordingly, transmit power required for each antenna to transmit a signal in the multi-node system can be reduced compared to the conventional centralized antenna system using MIMO. In addition, a transmission distance between an antenna and a UE is reduced to decrease pathloss and enable rapid data transmission in a multi-node system. This can improve transmission capacity and power efficiency of a cellular system and meet communication performance having relatively uniform quality regardless of UE locations in a cell. Further, the multi-node system reduces signal loss generated during transmission since base station(s) or base station controller(s) connected to a plurality of nodes transmit/receive data in cooperation with each other. When nodes spaced apart by over a predetermined distance perform coordinated communication with UE, correlation and interference between antennas are reduced. Therefore, a high signal to interference-plus-noise ratio (SINR) can be obtained according to the multi-node coordinated communication scheme.

Owing to the above-mentioned advantages of the multi-node system, the multi-node system is used with or replaces conventional centralized antenna systems, becoming the foundation of a new form of cellular communication in order to reduce base station cost and backhaul network maintenance cost while extending service coverage and improving channel capacity and SINR in next-generation mobile communication systems.

DISCLOSURE

Technical Problem

An object of the present invention devised to solve the problem lies in a method for transmitting and receiving uplink signals.

Another object of the present invention devised to solve the problem lies in a method for adjusting timing advance when uplink signals are transmitted to a plurality of eNBs.

It is to be understood that both the foregoing general description and the following detailed description of the present invention are exemplary and explanatory and are intended to provide further explanation of the invention as claimed.

Technical Solution

The object of the present invention can be achieved by providing a method for transmitting an uplink signal in a wireless communication system, the method including transmitting an uplink signal at a first uplink transmission timing determined based on a first timing advance command received from a first serving cell, and transmitting an uplink signal at a second uplink transmission timing determined based on a second timing advance command when a specific condition is satisfied.

Additionally or alternatively, when the specific condition is satisfied may be a case in which a cell identifier of a second serving cell is used for the uplink signal.

Additionally or alternatively, when the specific condition is satisfied may be a case in which a specific subframe set is used to transmit the uplink signal.

Additionally or alternatively, the second timing advance command may be a specific constant or a value obtained by adding the specific constant to the first timing advance command.

Additionally or alternatively, the specific constant may be selected among a plurality of candidate constants given through higher layer signaling, based on a downlink control signal or a specific subframe set index.

Additionally or alternatively, the uplink signal transmitted at the first uplink transmission timing may be directed to the first serving cell, and the uplink signal transmitted at the second uplink transmission timing may be directed to the second serving cell.

In another aspect of the present invention, provided herein is a method for receiving an uplink signal in a wireless communication system, the method including receiving an uplink signal at a first uplink transmission timing determined based on a first timing advance command, and receiving an uplink signal at a second uplink transmission timing determined based on a second timing advance command when a specific condition is satisfied.

In another aspect of the present invention, provided herein is a User Equipment (UE) configured to transmit an uplink signal in a wireless communication system, the UE including a Radio Frequency (RF) unit, and a processor configured to control the RF unit, wherein the processor is configured to transmit an uplink signal at a first uplink transmission timing determined based on a first timing advance command received from a first serving cell, and to transmit an uplink signal at a second uplink transmission timing determined based on a second timing advance command when a specific condition is satisfied.

Additionally or alternatively, when the specific condition is satisfied may be a case in which a cell identifier of a second serving cell is used for the uplink signal.

Additionally or alternatively, when the specific condition is satisfied may be a case in which a specific subframe set is used to transmit the uplink signal.

Additionally or alternatively, the second timing advance command may be a specific constant or a value obtained by adding the specific constant to the first timing advance command.

Additionally or alternatively, the specific constant may be selected among a plurality of candidate constants given through higher layer signaling, based on a downlink control signal or a specific subframe set index.

Additionally or alternatively, the uplink signal transmitted at the first uplink transmission timing may be directed to the first serving cell, and the uplink signal transmitted at the second uplink transmission timing may be directed to the second serving cell.

In another aspect of the present invention, provided herein is a Base Station (BS) configured to receive an uplink signal in a wireless communication system, the BS including a Radio Frequency (RF) unit, and a processor configured to control the RF unit, wherein the processor is configured to receive an uplink signal at a first uplink transmission timing determined based on a first timing advance command, and to receive an uplink signal at a second uplink transmission timing determined based on a second timing advance command when a specific condition is satisfied.

It is to be understood that both the foregoing general description and the following detailed description of the present invention are exemplary and explanatory and are intended to provide further explanation of the invention as claimed.

Advantageous Effects

According to embodiments of the present invention, an uplink signal may be efficiently transmitted or received.

Furthermore, according to embodiments of the present invention, an uplink signal transmitted from a UE located at a cell edge may be received by a corresponding reception eNB at an appropriate timing.

It will be appreciated by persons skilled in the art that that the effects that could be achieved with the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the invention and are incorporated in and constitute a part of this application, illustrate embodiments of the invention and together with the description serve to explain the principle of the invention. In the drawings.

BEST MODE

Figure 1:
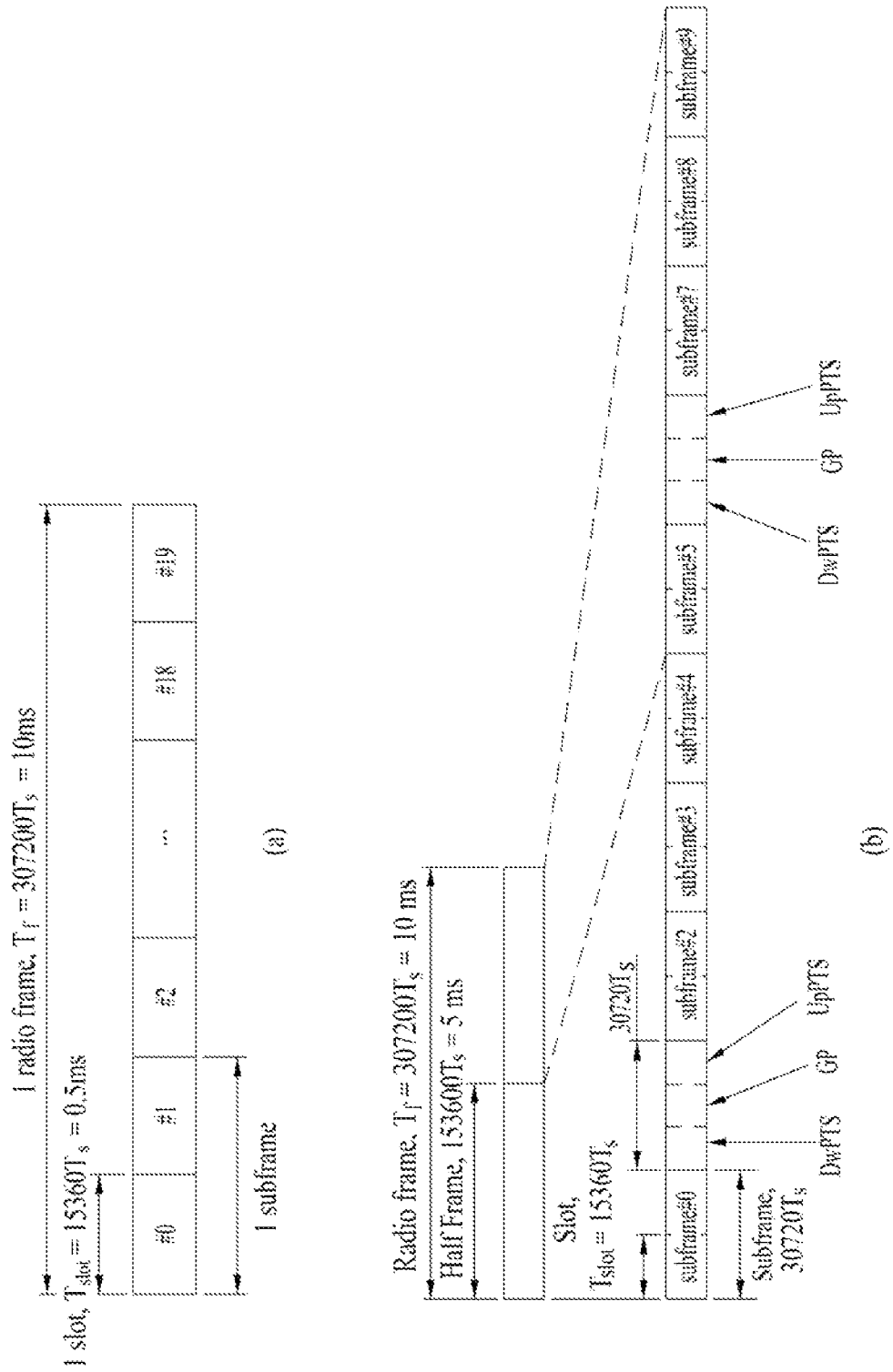
FIG. 1 illustrates an exemplary radio frame structure in a wireless communication system.

Reference will now be made in detail to the exemplary embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the invention. The following detailed description includes specific details in order to provide a thorough understanding of the present invention. However, it will be apparent to those skilled in the art that the present invention may be practiced without such specific details.

Further, a technique, a device, and a system, which will be described hereinbelow, may be applied to various multiple access radio systems. For convenience, description will be given under the assumption that the present invention is applied to 3GPP LTE(-A). However, technical features of the present invention are not limited thereto. For example, although the following detailed description is given based on a 3GPP LTE(-A) mobile communication system, the present invention is applicable to other mobile communication systems except for matters that are specific to 3GPP LTE(-A).

In some instances, known structures and devices are omitted or are shown in block diagram form, focusing on important features of the structures and devices, so as not to obscure the concept of the present invention. The same reference numbers will be used throughout this specification to refer to the same or like parts.

In the present invention, a user equipment (UE) denotes a fixed or mobile type terminal. Examples of the UE include various devices that transmit and receive user data and/or various kinds of control information to and from a base station. The UE may be referred to as a terminal equipment (TE), a mobile station (MS), a mobile terminal (MT), a user terminal (UT), a subscriber station (SS), a wireless device, a personal digital assistant (PDA), a wireless modem, or a handheld device. In addition, in the present invention, a base station (BS) means a fixed station that performs communication with a UE and/or another BS, and exchanges various kinds of data and control information with the UE and another BS. The BS may be referred to as an advanced base station (ABS), a node-B (NB), an evolved node-B (eNB), a base transceiver system (BTS), an access point (AP), or a processing server (PS).

In the present invention, a physical downlink control channel (PDCCH), a physical control format indicator channel (PCFICH), a physical hybrid automatic retransmit request indicator channel (PHICH), and a physical downlink shared channel (PDSCH) refer to a set of time-frequency resources or Resource Elements (REs) carrying downlink control information (DCI), a set of time-frequency resources or REs carrying a control format indicator (CFI), a set of time-frequency resources or REs carrying downlink acknowledgement (ACK)/negative ACK (NACK), and a set of time-frequency resources or REs carrying downlink data, respectively. In addition, a physical uplink control channel (PUCCH) and a physical uplink shared channel (PUSCH) refer to a set of time-frequency resources or REs carrying uplink control information (UCI) and a set of time-frequency resources or REs uplink data, respectively. In the present invention, in particular, a time-frequency resource or RE that is assigned to or belongs to PDCCH/PCFICH/PHICH/PD SCH/PUCCH/PUSCH is referred to as PDCCH/PCFICH/PHICH/PDSCH/PUCCH/PUSCH RE or PDCCH/PCFICH/PHICH/PDSCH/PUCCH/PUSCH time-frequency resource, respectively. Therefore, in the present invention, PUCCH/PUSCH transmission of a UE is conceptually identical to UCI/uplink data/random access signal transmission on PUSCH/PUCCH, respectively. In addition, PDCCH/PCFICH/PHICH/PDSCH transmission of a BS is conceptually identical to downlink data/DCI transmission on PDCCH/PCFICH/PHICH/PDSCH, respectively.

Also, in the present invention, Cell-specific Reference Signal (CRS)/Demodulation Reference Signal (DMRS)/Channel State Information Reference Signal (CSI-RS) time-frequency resources (or REs) respectively mean REs that may be allocated or used for CRS/DMRS/CSI-RS, or time-frequency resources (or REs) carrying CRS/DMRS/CSI-RS. Also, subcarriers that include CRS/DMRS/CSI-RS RE may be referred to as CRS/DMRS/CSI-RS subcarriers, and OFDM symbols that include CRS/DMRS/CSI-RS RE may be referred to as CRS/DMRS/CSI-RS symbols. In addition, sounding reference signal (SRS) time-frequency resources (REs) refer to time-frequency resources (REs) carrying an SRS that is transmitted from a UE to a BS and is used by the BS for measurement of an uplink channel state formed between the UE and the BS. A reference signal (RS) refers to a predefined particular waveform of signal, known to the UE and the BS and is also referred to as a pilot.

In the meantime, in the present invention, a cell means a localized area where one BS, node(s) or antenna port(s) provides a communication service. Accordingly, in the present invention, communication with a specific cell may mean communication with a BS, node, or antenna port, which provides a communication service to the specific cell. Also, downlink/uplink signals of the specific ell mean downlink/uplink signals to a BS, node or antenna port, which provides a communication service to the specific cell. Moreover, channel status/quality of the specific cell means channel status/quality of a channel or communication link formed between the BS, node or antenna port, which provides a communication service to the specific cell, and the UE.

FIG. 1 illustrates the structure of a radio frame used in a wireless communication system. Specifically, FIG. 1(a) illustrates an exemplary structure of a radio frame which can be used in frequency division duplex (FDD) in 3GPP LTE(-A) and FIG. 1(b) illustrates an exemplary structure of a radio frame which can be used in time division duplex (TDD) in 3GPP LTE(-A).

Referring to FIG. 1, a 3GPP LTE(-A) radio frame is 10 ms ($307,200T_s$) in duration. The radio frame is divided into 10 subframes of equal size. Subframe numbers may be assigned to the 10 subframes within one radio frame, respectively. Here, $T_s$ denotes sampling time where $T_s=1/(2048*15 \text{ kHz})$. Each subframe is 1 ms long and further divided into two slots. 20 slots are sequentially numbered from 0 to 19 in one radio frame. Duration of each slot is 0.5 ms. A time interval in which one subframe is transmitted is defined as a transmission time interval (TTI). Time resources may be distinguished by a radio frame number (or radio frame index), a subframe number (or subframe index), a slot number (or slot index), and the like.

A radio frame may have different configurations according to duplex modes. In FDD mode for example, since downlink (DL) transmission and uplink (UL) transmission are discriminated according to frequency, a radio frame for a specific frequency band operating on a carrier frequency includes either DL subframes or UL subframes. In TDD mode, since DL transmission and UL transmission are discriminated according to time, a radio frame for a specific frequency band operating on a carrier frequency includes both DL subframes and UL subframes.

Table 1 shows an exemplary UL-DL configuration within a radio frame in TDD mode.

TABLE 1

| DL-UL configuration | Downlink-to-Uplink switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D denotes a DL subframe, U denotes a UL subframe, and S denotes a special subframe. The special subframe includes three fields, i.e. downlink pilot time slot (DwPTS), guard period (GP), and uplink pilot time slot (UpPTS). DwPTS is a time slot reserved for DL transmission and UpPTS is a time slot reserved for UL transmission. Table 2 shows an example of the special subframe configuration.

TABLE 2

| Special subframe configuration | Normal cyclic prefix in downlink | | | Extended cyclic prefix in downlink | | |
|---|---|---|---|---|---|---|
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | 4384 · $T_s$ | 5120 · $T_s$ |
| 5 | 6592 · $T_s$ | 4384 · $T_s$ | 5120 · $T_s$ | 20480 · $T_s$ | | |
| 6 | 19760 · $T_s$ | | | 23040 · $T_s$ | | |
| 7 | 21952 · $T_s$ | | | — | — | — |
| 8 | 24144 · $T_s$ | | | — | — | — |

Figure 2:
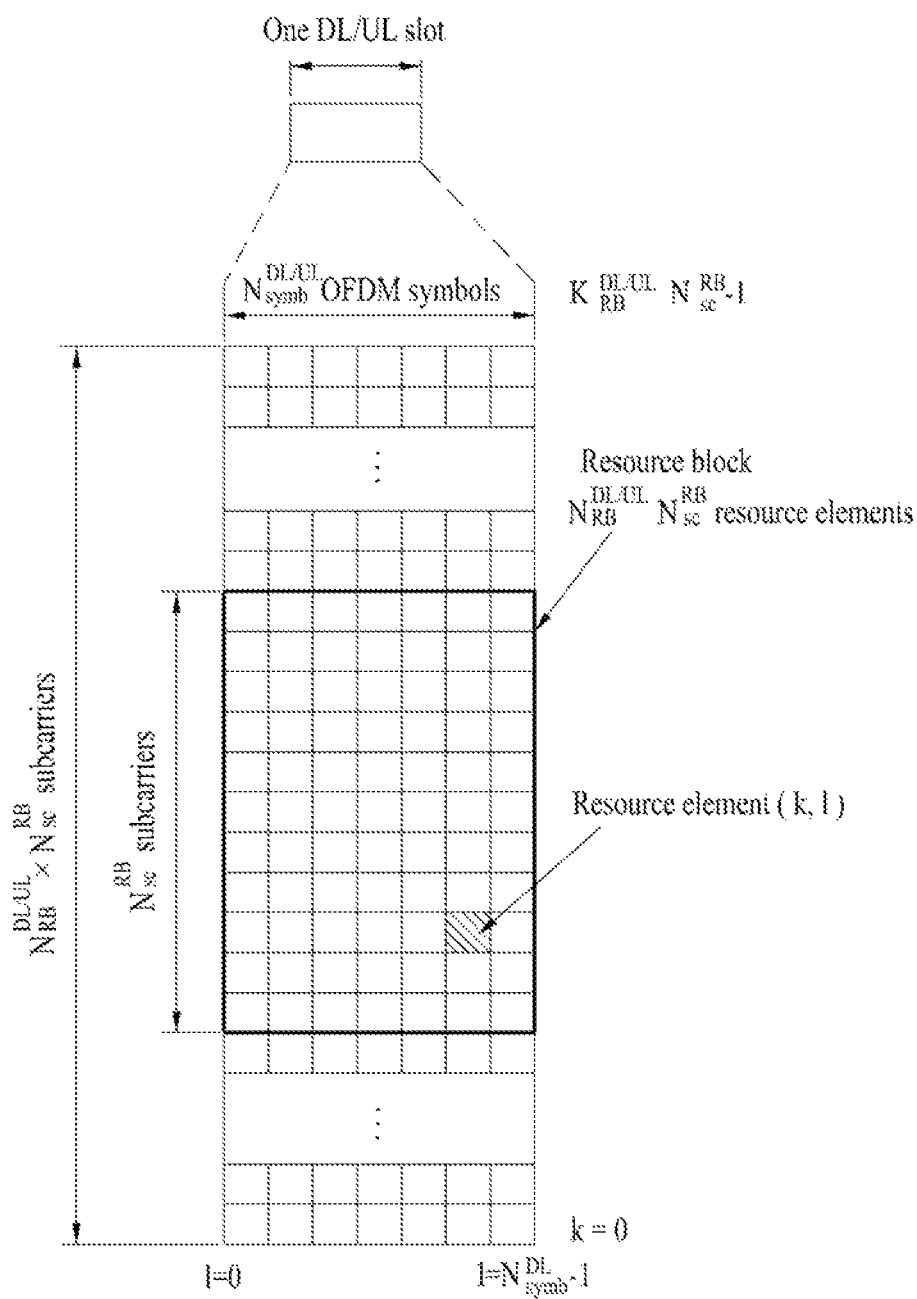
FIG. 2 illustrates an exemplary structure of a Downlink/Uplink (DL/UL) slot in a wireless communication system.

FIG. 2 illustrates the structure of a DL/UL slot structure in a wireless communication system. In particular, FIG. 2 illustrates the structure of a resource grid of a 3GPP LTE(-A) system. One resource grid exists per antenna port.

A slot includes a plurality of orthogonal frequency division multiplexing (OFDM) symbols in the time domain and includes a plurality of resource blocks (RBs) in the frequency domain. The OFDM symbol may refer to one symbol duration. Referring to FIG. 2, a signal transmitted in each slot may be expressed by a resource grid including $N^{DL/UL}_{RB}*N^{RB}_{sc}$ subcarriers and $N^{DL/DL}_{symb}$ OFDM symbols. $N^{DL}_{RB}$ denotes the number of resource blocks (RBs) in a DL slot and $N^{UL}_{RB}$ denotes the number of RBs in a UL slot. $N^{DL}_{RB}$ and $N^{UL}_{RB}$ depend on a DL transmission bandwidth and a UL transmission bandwidth, respectively. $N^{DL}_{symb}$ denotes the number of OFDM symbols in a DL slot, $N^{UL}_{symb}$ denotes the number of OFDM symbols in a UL slot, and $N^{RB}_{sc}$ denotes the number of subcarriers configuring one RB.

An OFDM symbol may be referred to as an OFDM symbol, an SC-FDM symbol, etc. according to multiple access schemes. The number of OFDM symbols included in one slot may be varied according to channel bandwidths and CP lengths. For example, in a normal cyclic prefix (CP) case, one slot includes 7 OFDM symbols. In an extended CP case, one slot includes 6 OFDM symbols. Although one slot of a subframe including 7 OFDM symbols is shown in FIG. 2 for convenience of description, embodiments of the present invention are similarly applicable to subframes having a different number of OFDM symbols. Referring to FIG. 2, each OFDM symbol includes $N^{DL/UL}_{RB}*N^{RB}_{sc}$ subcarriers in the frequency domain. The type of the subcarrier may be divided into a data subcarrier for data transmission, a reference signal (RS) subcarrier for RS transmission, and a null subcarrier for a guard band and a DC component. The null subcarrier for the DC component is unused and is mapped to a carrier frequency $f_0$ in a process of generating an OFDM signal or in a frequency up-conversion process. The carrier frequency is also called a center frequency.

One RB is defined as $N^{DL/UL}_{symb}$ (e.g. 7) consecutive OFDM symbols in the time domain and as $N^{RB}_{sc}$ (e.g. 12) consecutive subcarriers in the frequency domain. For reference, a resource composed of one OFDM symbol and one subcarrier is referred to a resource element (RE) or tone. Accordingly, one RB includes $N^{DL/UL}_{symb}*N^{RB}_{sc}$ REs. Each RE within a resource grid may be uniquely defined by an index pair (k, l) within one slot. k is an index ranging from 0 to $N^{DL/UL}_{RB}*N^{RB}_{sc}-1$ in the frequency domain, and l is an index ranging from 0 to $N^{DL/UL}_{symb}1-1$ in the time domain.

In one subframe, two RBs each located in two slots of the subframe while occupying the same $N^{RB}_{sc}$ consecutive subcarriers are referred to as a physical resource block (PRB) pair. Two RBs configuring a PRB pair have the same PRB number (or the same PRB index). A virtual resource block (VRB) is a logical resource allocation unit for resource allocation. The VRB has the same size as that of the PRB. A VRB may be classified into a localized VRB or a distributed VRB depending on a mapping mode of VRB into PRB. Localized VRBs are mapped directly to PRBs such that VRB number (VRB index) corresponds to PRB number. That is, $n_{PRB}=n_{VRB}$ is obtained. Localized VRBs are numbered from 0 to $N^{DL}_{VRB}-1$, where $N^{DL}_{VRB}=N^{DL}_{RB}$. Accordingly, according to the localized mapping mode, VRBs having the same VRB number are mapped into PRBs having the same PRB number at the first slot and the second slot. On the other hand, distributed VRBs are mapped to PRBs via interleaving. Accordingly, VRBs having the same VRB number may be mapped into the PRBs having different PRB numbers at the first slot and the second slot. Two PRBs, which are respectively located at two slots of the subframe and have the same VRB number, will be referred to as VRB pair.

Figure 3:
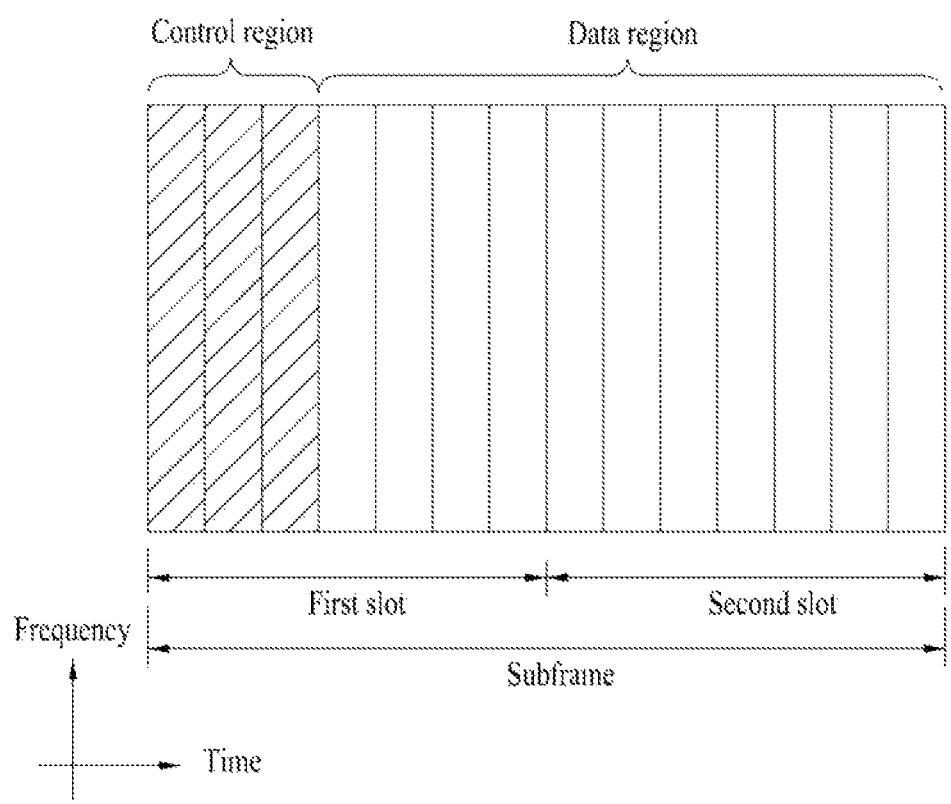
FIG. 3 illustrates an exemplary structure of a DL subframe in a 3$^{rd}$ Generation Partnership project (3GPP) Long Term Evolution (LTE)/LTE-Advanced (LTE-A) system.

FIG. 3 is a diagram illustrating a structure of a downlink frame used in a 3GPP LTE(-A) system.

The downlink subframe is divided into a control region and a data region in a time domain. Referring to FIG. 3, maximum three (or four) OFDM symbols located at the front of the first slot of the subframe correspond to the control region to which a control channel is allocated. Hereinafter, a resource region available for PDCCH transmission for the downlink subframe will be referred to as a PDCCH region. The other OFDM symbols not the OFDM symbols used for the control region correspond to the data region to which a physical downlink shared channel (PDSCH) is allocated. Hereinafter, a resource region available for PDSCH transmission for the downlink subframe will be referred to as a PDSCH region. Examples of the downlink control channel used in the 3GPP LTE include a PCFICH (Physical Control Format Indicator CHannel), a PDCCH (Physical Downlink Control CHannel), and a PHICH (Physical Hybrid ARQ Indicator CHannel). The PCFICH is transmitted from the first OFDM symbol of the subframe, and carries information on the number of OFDM symbols used for transmission of the control channel within the subframe. The PHICH carries HARQ ACK/NACK (acknowledgement/negative-acknowledgement) signal in response to uplink transmission.

The control information transmitted through the PDCCH will be referred to as downlink control information (DCI). The DCI includes resource allocation information for a UE or UE group and other control information. For example, the DCI includes transport format and resource allocation information of a downlink shared channel (DL-SCH), transport format and resource allocation information of an uplink shared channel (UL-SCH), paging information on a paging channel (PCH), system information on the DL-SCH, resource allocation information of upper layer control message such as random access response transmitted on the PDSCH, a set of transmission (Tx) power control commands of individual UEs within a UE group, Tx power control information, and activity information of voice over Internet protocol (VoIP). The size and usage of the DCI carried by one PDCCH are varied depending on DCI formats. The size of the DCI may be varied depending on a coding rate.

A plurality of PDCCHs may be transmitted within a control region. The UE may monitor the plurality of PDCCHs. The BS determines a DCI format depending on the DCI to be transmitted to the UE, and attaches cyclic redundancy check (CRC) to the DCI. The CRC is masked (or scrambled) with an identifier (for example, radio network temporary identifier (RNTI)) depending on usage of the PDCCH or owner of the PDCCH. For example, if the PDCCH is for a specific UE, the CRC may be masked with an identifier (for example, cell-RNTI (C-RNTI)) of the corresponding UE. If the PDCCH is for a paging message, the CRC may be masked with a paging identifier (for example, Paging-RNTI (P-RNTI)). If the PDCCH is for system information (in more detail, system information block (SIB)), the CRC may be masked with system information RNTI (SI-RNTI). If the PDCCH is for a random access response, the CRC may be masked with a random access RNTI (RA-RNTI). For example, CRC masking (or scrambling) includes XOR operation of CRC and RNTI at a bit level.

The PDCCH is transmitted on aggregation of one or a plurality of continuous control channel elements (CCEs). The CCE is a logic allocation unit used to provide a coding rate based on the status of a radio channel to the PDCCH. The CCE corresponds to a plurality of resource element groups (REGs). For example, one CCE corresponds to nine resource element groups (REGs), and one REG corresponds to four REs. Four QPSK symbols are mapped into each REG. A resource element (RE) occupied by the reference signal (RS) is not included in the REG. Accordingly, the number of REGs within given OFDM symbols is varied depending on the presence of the RS. The REGs are also used for other downlink control channel (that is, PDFICH and PHICH). The number of DCI formats and DCI bits is determined in accordance with the number of CCEs.

CCEs are numbered and used consecutively. In order to simplify a decoding process, the PDCCH having a format that includes n number of CCEs may only start on a CCE fulfilling a CCE number corresponding to a multiple of n. The number of CCEs used for transmission of a specific PDCCH is determined by the BS in accordance with a channel status. For example, one CCE may be required for a PDCCH for a UE (for example, adjacent to BS) having a good downlink channel. However, in case of a PDCCH for a UE (for example, located near the cell edge) having a poor channel, eight CCEs may be required to obtain sufficient robustness. Also, a power level of the PDCCH may be adjusted to correspond to a channel status.

Figure 4:
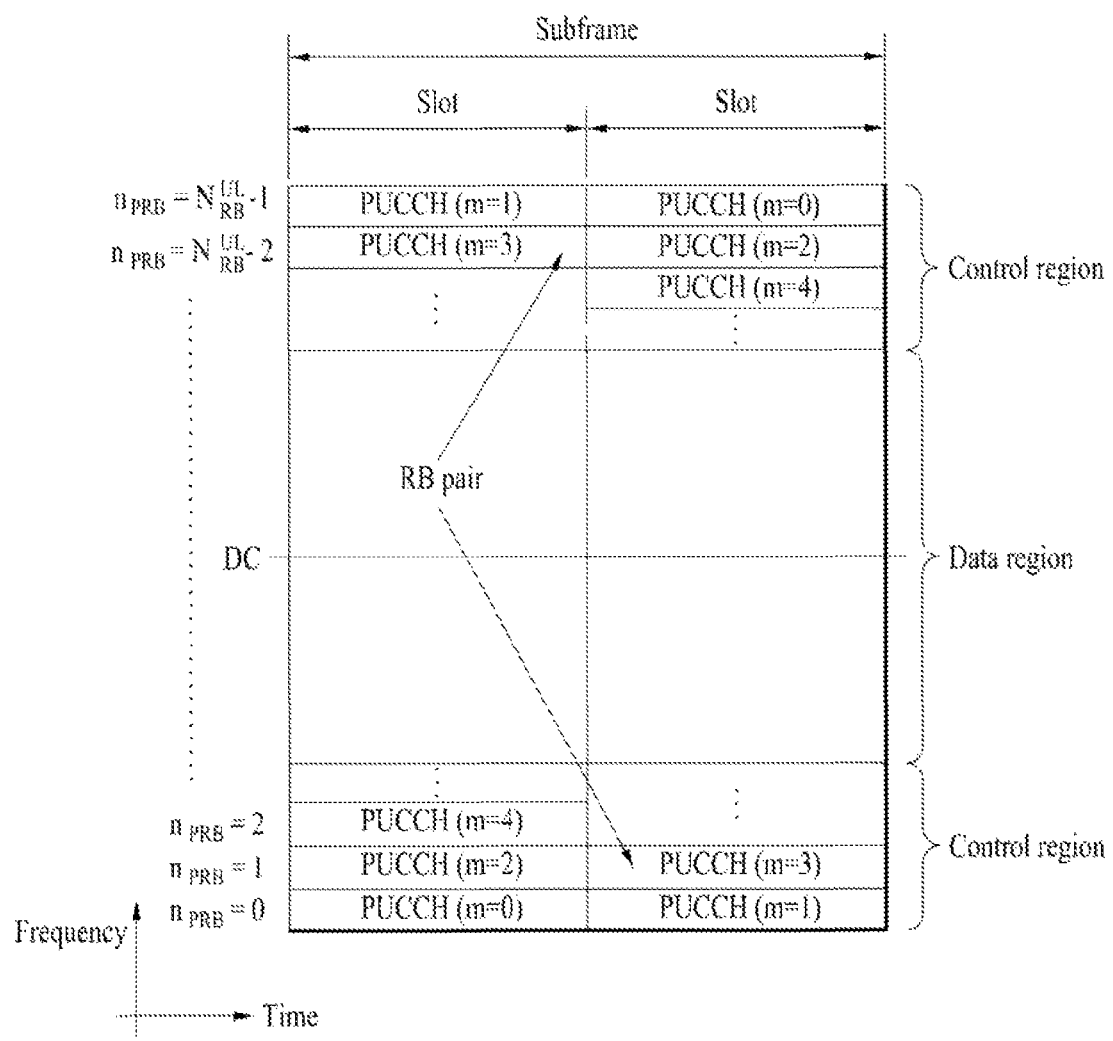
FIG. 4 illustrates an exemplary structure of a UL subframe in the 3GPP LTE/LTE-A system.

FIG. 4 illustrates the structure of a UL subframe used in a 3GPP LTE(-A) system.

Referring to FIG. 4, a UL subframe may be divided into a data region and a control region in the frequency domain. One or several PUCCHs may be allocated to the control region to deliver UCI. One or several PUSCHs may be allocated to the data region of the UL subframe to deliver user data. The control region and the data region in the UL subframe may also be referred to as a PUCCH region and a PUSCH region, respectively. A sounding reference signal (SRS) may be allocated to the data region. The SRS is transmitted on the last OFDM symbol of the UL subframe in the time domain and is transmitted on a data transmission band, that is, a data region, of the UL subframe in the frequency domain. SRSs of several UEs, which are transmitted/received on the last OFDM symbol of the same subframe, can be distinguished according to a frequency location/sequence.

If a UE employs an SC-FDMA scheme in UL transmission, in a 3GPP LTE release-8 or release-9 system, a PUCCH and a PUSCH cannot be simultaneously transmitted on one carrier in order to maintain a single carrier property. In a 3GPP LTE release-10 system, support/non-support of simultaneous transmission of a PUCCH and a PUSCH may be indicated by higher layers.

In the UL subframe, subcarriers distant from a direct current (DC) subcarrier are used as the control region. In other words, subcarriers located at both ends of a UL transmission bandwidth are used to transmit UL control information. A DC subcarrier is a component unused for signal transmission and is mapped to a carrier frequency $f_0$ in a frequency up-conversion process. A PUCCH for one UE is allocated to an RB pair belonging to resources operating in one carrier frequency and RBs belonging to the RB pair occupy different subcarriers in two slots. The PUCCH allocated as above will be expressed as that the pair of RBs allocated to the PUCCH is subjected to frequency hopping at the slot boundary. However, if frequency hopping is not applied to the RB pair, the RBs forming the RB pair occupy the same subcarriers at the two slots.

The size and usage of UCI carried by one PUCCH may be changed according to PUCCH format and the size of the UCI may be changed according to coding rate. For example, the following PUCCH format may be defined.

TABLE 3

| PUCCH format | Modulation scheme | Number of bits per subframe | Usage | Etc. |
|---|---|---|---|---|
| 1 | N/A | N/A (exist or absent) | SR (Scheduling Request) | |
| 1a | BPSK | 1 | ACK/NACK or SR + ACK/NACK | One codeword |
| 1b | QPSK | 2 | ACK/NACK or SR + ACK/NACK | Two codeword |
| 2 | QPSK | 20 | CQI/PMI/RI | Joint coding ACK/NACK (extended CP) |
| 2a | QPSK + BPSK | 21 | CQI/PMI/RI + ACK/NACK | Normal CP only |
| 2b | QPSK + QPSK | 22 | CQI/PMI/RI + ACK/NACK | Normal CP only |
| 3 | QPSK | 48 | ACK/NACK or SR + ACK/NACK or CQI/PMI/RI + ACK/NACK | |

Referring to Table 3, PUCCH format 1 series and PUCCH format 3 series are mainly used to transmit ACK/NACK information and PUCCH format 2 series is mainly used to carry channel state information (CSI) such as channel quality indicator (CQI)/precoding matrix indicator (PMI)/rank indicator (RI).

A BS allocates PUCCH resources for UCI transmission to a UE using a higher layer signal, using a dynamic control signal, or in an implicit manner. Physical resources used for a PUCCH depend on 2 parameters given by a higher layer, N(2)RB and N(1)cs. The variable N(2)RB, which satisfies N(2)RB≥0, indicates an available bandwidth for PUCCH format 2/2a/2b transmission in each slot and is expressed as an integer multiple of NRBsc. The variable N(1)cs indicates the number of cyclic shifts used for PUCCH format 1/1a/1b in a resource block used for a mixture of format 1/1a/1b and format 2/2a/2b. The value of N(1)cs is an integer multiple of ΔPUCCHshift within a range of {0, 1, . . . , 7}. ΔPUCCHshift is provided by a higher layer. If N(1)cs=0, no mixed resource block is present. No more than 1 resource block supports the mixture of PUCCH format 1/1a/1b and PUCCH format 2/2a/2b in each slot. Resources used for transmission of PUCCH format 1/1a/1b, PUCCH format 2/2a/2b, and PUCCH format 3 through antenna port p are expressed as non-negative integer indices n(1,p)PUCCH, n(2,p)PUCCH<N(2)RB·NRBsc+ceil(N(1)cs/8)·(NRBsc−N(1)cs−2) and n(2,p)PUCCH, respectively.

Specifically, an orthogonal sequence and/or a cyclic shift to be applied to corresponding UCI is determined based on a PUCCH resource index according to a predefined rule for each PUCCH format, and resource indices of 2 resource blocks in a subframe, to which a PUCCH is to be mapped, are given. For example, a PRB for PUCCH transmission in slot ns is given as follows.

$$n_{PRB} = \begin{cases} \left\lfloor \frac{m}{2} \right\rfloor & \text{if } (m+n_s \bmod 2) \bmod 2 = 0 \\ N_{RB}^{UL} - 1 - \left\lfloor \frac{m}{2} \right\rfloor & \text{if } (m+n_s \bmod 2) \bmod 2 = 1 \end{cases} \quad \text{[Equation 1]}$$

In Equation 1, a variable m depends on a PUCCH format and is given as Equation 2, Equation 3, and Equation 4 for PUCCH format 1/1a/1b, PUCCH format 2/2a/2b, and PUCCH format 3, respectively.

$$m = \begin{cases} N_{RB}^{(2)} & \text{if } n_{PUCCH}^{(1,\tilde{p})} < c \cdot N_{cs}^{(1)} / \Delta_{shift}^{PUCCH} \\ \left\lfloor \frac{n_{PUCCH}^{(1,\tilde{p})} - c \cdot N_{cs}^{(1)} / \Delta_{shift}^{PUCCH}}{c \cdot N_{cs}^{RB} / \Delta_{shift}^{PUCCH}} \right\rfloor + N_{RB}^{(2)} + \left\lceil \frac{N_{cs}^{(1)}}{8} \right\rceil & \text{otherwise} \end{cases} \quad \text{[Equation 2]}$$

$$c = \begin{cases} 3 & \text{normal cyclic prefix} \\ 2 & \text{extended cyclic prefix} \end{cases}$$

In Equation 2, n(1, p)PUCCH denotes a PUCCH resource index of antenna port p for PUCCH format 1/1a/1b. In the case of an ACK/NACK PUCCH, n(1, p)PUCCH is a value implicitly determined based on the first CCE index of a PDCCH carrying scheduling information of a corresponding PDSCH.

$$m = \lfloor n_{PUCCH}^{(2,\tilde{p})} / N_{sc}^{RB} \rfloor \quad \text{[Equation 3]}$$

In Equation 3, n(2)PUCCH denotes a PUCCH resource index of antenna port p for PUCCH format 2/2a/2b and is a value transmitted from a BS to a UE through higher layer signaling.

$$m = \lfloor n_{PUCCH}^{(3,\tilde{p})} / N_{SF,0}^{PUCCH} \rfloor \quad \text{[Equation 4]}$$

In Equation 4, n(3)PUCCH denotes a PUCCH resource index of antenna port p for PUCCH format 3 and is a value transmitted from a BS to a UE through higher layer signaling. NPUCCHSF,0 denotes a spreading factor for the first slot of a subframe. For both of 2 slots in a subframe using normal PUCCH format 3, NPUCCHSF,0 is 5. For the first and second slots of a subframe using shortened PUCCH format 3, NPUCCHSF,0 is 5 and 4, respectively.

Referring to Equation 2, PUCCH resources for an ACK/NACK are not pre-allocated to each UE. Rather, each of a plurality of UEs within a cell uses a part of a plurality of PUCCH resources whenever necessary. Specifically, a PUCCH resource used by a UE for ACK/NACK transmission is dynamically determined based on a PDCCH carrying scheduling information for a PDSCH carrying corresponding downlink data. The whole region of each DL subframe in which PDCCHs are transmitted includes a plurality of Control Channel Elements (CCEs) and a PDCCH directed to a UE includes one or more CCEs. The UE transmits an ACK/NACK using a PUCCH resource linked to a specific CCE (e.g., the first CCE) among the CCEs of a PDCCH received by the UE. Hereinafter, a PUCCH resource dynamically determined in association with a PDCCH for ACK/NACK transmission is referred to as an ACK/NACK PUCCH resource.

An ACK/NACK is control information to be fed back from a receiver to a transmitter depending on whether data transmitted from the transmitter has been successfully decoded by the receiver. For example, if a UE has successfully decoded downlink data, the UE may feed back ACK information to a BS. Otherwise, the UE may feed back NACK information to the BS. Specifically, in an LTE system, ACK/NACK transmission of the receiver may be needed in 3 representative cases described below.

First, the receiver transmits an ACK/NACK in response to PDSCH transmission indicated by a detected PDCCH. Second, the receiver transmits an ACK/NACK for a PDCCH indicating Semi-Persistent Scheduling (SPS) release. Third, the receiver transmits an ACK/NACK for a PDSCH transmitted without PDCCH detection. The third case means ACK/NACK transmission for SPS. Unless otherwise mentioned, the ACK/NACK transmission scheme is not limited to one of the above 3 cases.

Timing Advance

Figure 5:
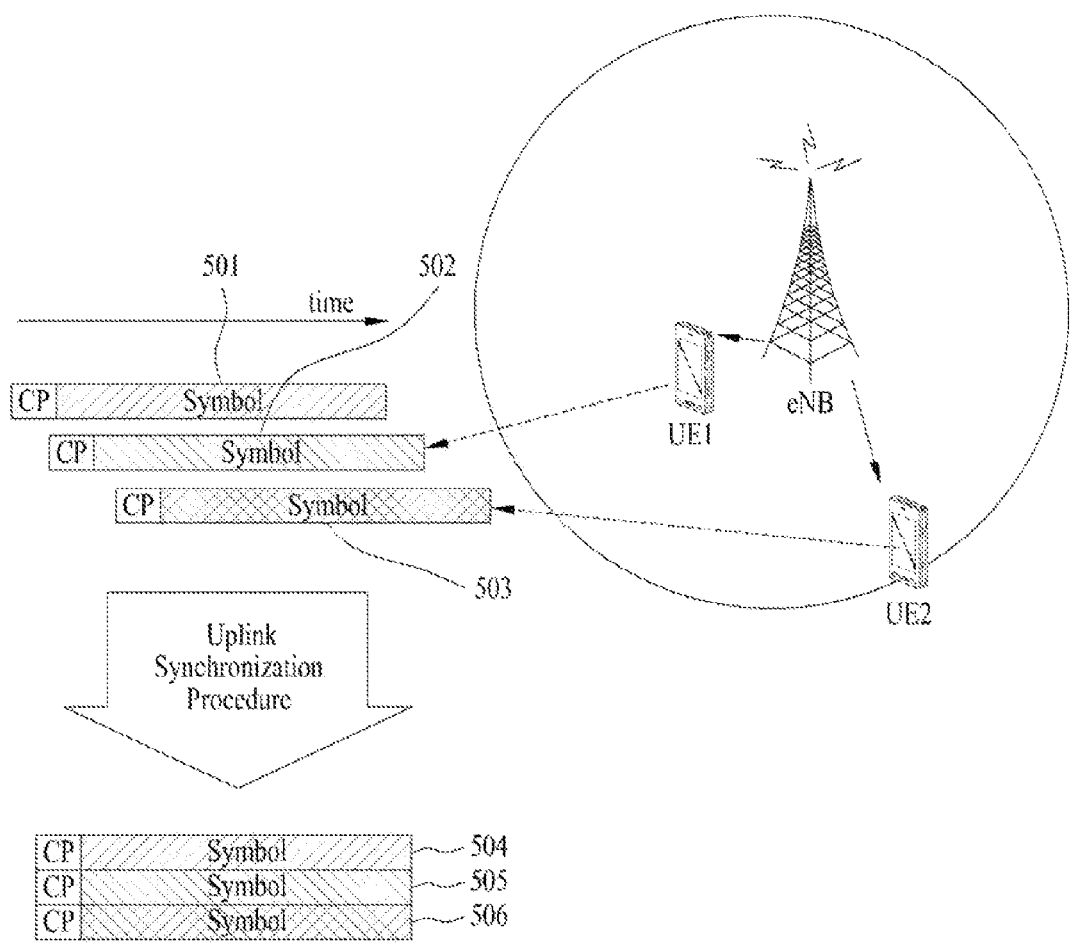
FIG. 5 is a view showing the necessity and function of an uplink synchronization procedure in a 3GPP LTE(-A) system.

FIG. 5 is a view showing the necessity and function of an uplink synchronization procedure in a 3GPP LTE(-A) system.

Referring to FIG. 5, UE1 is located close to an eNB and UE2 is spaced apart from the eNB compared to UE1. A propagation delay time means a time taken for radio transmission from an eNB to a UE (or from a UE to an eNB). A first propagation delay time is a time taken for radio transmission between UE1 and the eNB, and a second propagation delay time is a time taken for radio transmission between UE2 and the eNB. Since the distance between UE2 and the eNB is greater than the distance between UE1 and the eNB, the second propagation delay time is probably greater than the first propagation delay time.

Due to this difference in distance from each UE to the eNB, an uplink timing of UE1 is not synchronized with the uplink timing of UE2.

501 indicates a timing when the eNB receives and starts to decode uplink OFDM symbols, 502 indicates an uplink OFDM symbol transmission timing of UE1, and 503 indicates an uplink OFDM symbol transmission timing of UE2. It is shown that OFDM symbol reception timings of 501 to 503 are different from each other due to propagation delay times as described above. As such, since the uplink symbols transmitted from UE1 and UE2 do not have orthogonality and thus cause mutual interference, the eNB cannot successfully decode the uplink symbols (502 and 503) transmitted from UE1 and UE2.

An uplink synchronization procedure is a procedure for synchronizing uplink symbol reception timings of UE1, UE2 and the eNB. When the uplink synchronization procedure is completed, uplink OFDM symbol decoding timings may be synchronized by the UEs and the eNB as indicated by 504 to 506.

Such an uplink synchronization procedure may be performed by transmitting uplink OFDM symbols at an earlier timing by a UE which is away from an eNB, and transmitting uplink OFDM symbols at a later timing by a UE which is close to the eNB. Specifically, in the uplink synchronization procedure, the eNB transmits Timing Advance (TA) information to the UEs to provide information about timing adjustment. In this case, the TA information may be transmitted by the eNB using a Timing Advance Command MAC Control Element (TAC MAC CE), or a response message to a random access preamble transmitted by the UE for initial access (i.e., Random Access Response (RAR)). Then, the UE may adjust the uplink transmission timing thereof based on the received TA information.

The UE having received the TA information from the eNB in subframe n may perform timing adjustment from subframe n+6 based on the corresponding TA information. The TA information is information instructing to advance or delay the uplink transmission timing by a multiple of 16 Ts based on a current uplink timing.

To transmit the TA information to the UE, the eNB may transmit an absolute value of TA or only a difference value from a previously used TA value. For example, a currently used TA value is assumed as TA1. If a TA value to be newly applied is assumed as TA2, the eNB transmits only a difference value $\Delta(=TA2-TA1)$ between TA2 and TA1. The UE having received the value $\Delta$ may obtain TA2 to be newly applied, by adding the value $\Delta$ to TA1.

When decoding timings are synchronized in this manner, uplink symbols transmitted from UE1 and UE2 may maintain orthogonality, and the eNB may successfully decode the uplink symbols transmitted from UE1 and UE2.

Due to this reason or environment, the eNB may transmit a TA command to the UE to adjust an uplink timing of the UE in an LTE(-A) system. The UE having received the TA command from the eNB in an nth subframe should start timing adjustment based on the corresponding TA command from an (n+6)th subframe. Such timing adjustment is performed to advance or delay the uplink transmission timing by a multiple of 16*Ts based on a current uplink timing, and a timing adjustment value, e.g., a multiple of 16*Ts, is indicated by the TA command. Currently, this TA command is given to a specific UE as a single TA command and the UE persistently updates an uplink transmission timing based on the single TA command.

A special subframe including an Uplink Pilot Time Slot (UpPTS) and a Downlink Pilot Time Slot (DwPTS) is present in a TDD system as shown in FIG. 1 and Table 2. This special subframe is a frame specially configured to ensure a downlink-to-uplink switching time in consideration of a delay occurring until the UE actually receives a downlink signal and a time to be advanced to transmit an uplink signal by applying TA when the downlink subframe is switched to the uplink subframe. The DwPTS and the UpPTS prior to and subsequent to a guard period (GP) are used for downlink transmission and specific uplink transmission, respectively. Some SC-FDMA symbols may be used for corresponding transmission. Representative uplink transmission by the UpPTS includes SRS transmission and PRACH preamble (format 4) transmission. PUCCH transmission of the UpPTS is prohibited.

If the UpPTS of a specific serving cell consists of one SC-FDMA symbol in TDD, this SC-FDMA symbol may be used for SRS transmission. If the UpPTS of the specific serving cell includes two SC-FDMA symbols, both of the two symbols may be used for SRS transmission, and may be assigned to the same UE for SRS transmission.

In addition to a case in which one eNB is present as illustrated in FIG. 5, TA is also necessary for a wireless communication system in which one UE is served by a plurality of eNBs. Particularly, TA may be applied to Coordinated Multiple Point transmission and reception (CoMP).

Coordinated Multiple Point Transmission and Reception (CoMP) Operation

Figure 6:
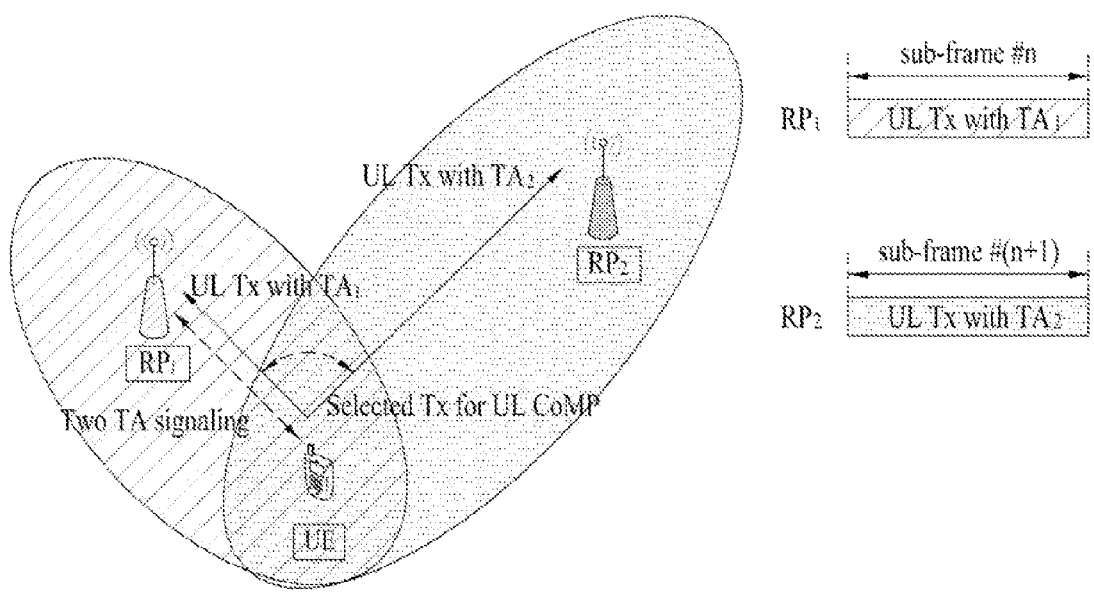
FIG. 6 illustrates a wireless communication environment to which an embodiment of the present invention is applicable.

FIG. 6 illustrates a network configuration for communication using CoMP according to an embodiment of the present invention. FIG. 6 illustrates a Heterogeneous Network (HetNet) environment in which a CoMP UE is connected to different DL/UL serving cells. Although two eNBs and one UE are illustrated in FIG. 6, this is merely an example and a larger number of eNBs and a larger number of UEs may be present in the network structure.

To satisfy enhanced system performance requirements of 3GPP LTE-A, CoMP (known as co-MIMO, collaborative MIMO, or network MIMO) has been proposed. The CoMP technology may increase the performance of UEs located at a cell edge and an average sector throughput.

Inter-Cell Interference (ICI) generally degrades the performance of UEs located at a cell edge and an average sector throughput in a multi-cell environment having a frequency reuse factor of 1. To reduce ICI, a legacy LTE system adopts a method for offering an appropriate throughput to a cell-edge UE in an environment constrained by interference, simply using a passive scheme such as Fractional Frequency Reuse (FFR) through UE-specific power control. However, it may be preferred to reduce ICI or reuse ICI as a UE-desired signal, rather than to decrease use of frequency resources per cell. For this purpose, CoMP transmission techniques may be used.

DL CoMP schemes may be classified largely into Joint Processing (JP) and Coordinated Scheduling/Beamforming (CS/CB).

According to the JP scheme, each point (BS) of a CoMP cooperation unit may use data. The CoMP cooperation unit refers to a set of BSs used for a CoMP transmission operation, also called a CoMP set. The JP scheme may be classified into joint transmission and dynamic cell selection.

Joint transmission refers to a technique of transmitting PDSCHs from a plurality of points (a part of or the whole CoMP cooperation unit) at one time. That is, a plurality of transmission points may simultaneously transmit data to a single UE. The joint transmission scheme may improve the quality of a received signal coherently or non-coherently and actively eliminate interference to other UEs.

Dynamic cell selection is a technique of transmitting a PDSCH from one point (of a CoMP cooperation unit) at one time. That is, one point of the CoMP cooperation unit transmits data to a single UE at a specific timing, while the other points of the CoMP cooperation unit do not transmit data to the UE at that timing. The point to transmit data to the UE may be dynamically selected.

Meanwhile, in the CS/CB scheme, a CoMP cooperation unit may perform cooperative beamforming for data transmission to a single UE. Here, only a serving cell transmits data to the UE but user scheduling/beamforming may be determined through coordination among cells of the CoMP cooperation unit.

UL CoMP reception refers to reception of a transmitted signal through cooperation among a plurality of points geographically spaced apart from each other. UL CoMP schemes include Joint Reception (JR) and Coordinated Scheduling/Beamforming (CS/CB).

JR is a technique of receiving a signal transmitted on a PUSCH by a plurality of reception points. CS/CB is a technique of receiving a PUSCH by only one point but determining user scheduling/beamforming through coordination among cells of a CoMP cooperation unit.

A case in which a plurality of UL points (i.e., reception points) exist may be referred to as UL CoMP, and a case in which a plurality of DL points (i.e., transmission points) exist may be referred to as DL CoMP.

The present invention proposes a method for configuring a UE to receive a plurality of TA commands instead of a single TA command in consideration of UL CoMP, i.e., uplink transmission to multiple reception points, and to perform uplink transmission depending on a predefined condition in synchronization with one of a plurality of uplink timings based on the TA commands.

In the CoMP operation, each subframe may be transmitted toward one of multiple RPs. For example, a target reception point may be determined through dynamic point selection in consideration of an available UL resource and/or a UL channel condition. As another example, a target reception point of SRS transmission can be different from the target reception point of PUCCH or PUSCH transmission because, as in a TDD system, and SRS can be directed to a macro eNB for downlink transmission and a PUCCH or a PUSCH can be directed to a nearby pico eNB or an RRH for uplink transmission.

In the state of FIG. 6, controls based on a plurality of TA commands may be used. That is, as illustrated in FIG. 6, a specific subframe may be transmitted toward a specific target reception point using a unique TA command set at each uplink transmission timing. In FIG. 6, uplink transmission may be performed toward RP1 based on TA1 in an nth subframe, and uplink transmission may be performed toward RP2 based on TA2 in an (n+1)th subframe.

A detailed description is now given of a specific operation for applying controls based on a plurality of TA commands.

Embodiment 1

According to Embodiment 1 of the present invention, as in a legacy LTE(-A) system, an eNB transmits only a single TA command to a UE and the UE accumulatively calculates/applies this command as single TA control. In this case, for uplink transmission in accordance with a specific condition, e.g., operation associated with a specific channel/signal or subframe set, or specific parameter(s) or DCI format(s), an uplink timing based on the single TA control may not be applied but a separately predefined uplink timing may be applied. For example, the predefined uplink timing may always be TA=0 under the specific condition, or TA may be fixed to specific constant value(s).

A description is now given of exemplary CoMP operation in a Heterogeneous Network (HetNet) environment in which a downlink serving-eNB of a UE is a macro-eNB and a reception point for uplink is a pico-eNB which is geographically closer to the UE (compared to the macro-eNB). The UE may transmit uplink data/signals toward the downlink serving-eNB, i.e., the macro-eNB, by adjusting an uplink timing according to single TA control based on a single TA command received from the downlink serving-eNB as in a legacy operation, and may always start specific uplink transmission of PUCCH/PUSCH/SRS toward a specific target reception point by applying the predefined uplink timing to a timing when a downlink subframe is completely received from the macro-eNB. For example, if the predefined uplink timing is TA=0, uplink transmission may be started immediately after the downlink subframe is completely received. Otherwise, if the predefined uplink timing is TA=specific constant, uplink transmission may be started before/after a time corresponding to the specific constant from when the downlink subframe is completely received.

In UL-CoMP illustrated in FIG. 6, the specific target reception point(s) other than the downlink serving-eNB are generally located geographically closer to the UE compared to the downlink serving eNB but have lower transmission power than the downlink serving-eNB. Accordingly, even when a delicate TA control of the UE is not applied, uplink transmission directed to the short-distance target reception point(s) may be appropriately received within a Cyclic Prefix (CP).

Alternatively, with reference to data actually measured in a process for configuring the UL-CoMP network, for specific uplink transmission of PUCCH/PUSCH/SRS toward the above specific reception point(s), the UE may always operate to start corresponding uplink transmission by applying a predefined fixed TA value to a timing when the downlink subframe is completely received. For example, TA=c may always be applied for uplink transmission toward the specific reception point(s). Here, c denotes a predefined constant value. Alternatively, for example, the value c may be a time-based specific value (e.g., a specific value corresponding to a multiple of $16*T_s$) and may be semi-statically provided to the UE through higher layer signaling (e.g., RRC signaling).

In addition, a variety of explicit/implicit indication schemes are also applicable. For example, after a plurality of values c (e.g., c(0), c(1), . . . ) are semi-statically provided through higher layer signaling, a dynamic indication (e.g., a specific bit indication through specific DCI format(s) such as UL-related DCI format(s)) about which of the constant values c(0), c(1), . . . are actually applied for uplink transmission directed to the specific target reception point(s) may be given, a certain subframe restriction may be used to apply a specific value c(n) to a specific subframe set, or a linkage may be given per DCI format to apply a specific value c(n) when specific DCI format(s) are received.

1-1. Additional Embodiment

In Embodiment 1 described above, as an example of the operation associated with specific parameter(s), it may be predefined to apply a part of Embodiment 1 to a scrambling initialization parameter (e.g., a Virtual Cell Identifier (VCI) replacing a legacy Physical layer Cell Identifier (PCI)) applied to each uplink transmission. That is, TA=c(n) may always be configured to be utilized as an uplink timing for uplink transmission using a specific VCI.

The above description is merely exemplary and the present invention should be understood and construed as including similar associations among various parameters and modifications thereof. That is, the predetermined specific constant value c(n) related to TA may be associated with a similar-characteristic parameter (e.g., VCI) appropriately for a situation and thus may be used to determine a corresponding uplink transmission timing.

1-2. Additional Embodiment

In Embodiment 1 described above, as an example of the operation associated with a specific subframe set, uplink transmission of PUCCH/PUSCH/SRS may be directed to a victim cell (e.g., a pico-cell) only in subframes configured as Almost Blank Subframes (ABSs) or reduced power ABSs (r-ABSs) in the case of enhanced Inter Cell Interference Coordination (eICIC), and it may be predefined to apply a part of Embodiment 1 to this specific subframe set. That is, TA=c(n) may always be configured to be utilized as an uplink timing for uplink transmission in subframes configured as ABSs or r-ABSs.

1-3. Additional Embodiment

In Embodiment 1 described above, the TA=c(n) value may be associated with specific power control parameter(s). For example, a plurality of P_SRS_offset values, e.g., P_SRS_offset(0), P_SRS_offset(1), . . . , may be configured for SRS power control. When a macro-eNB is a downlink serving-eNB, since Open-Loop Power Control (OLPC) of pico cell-target PUSCH power control can be performed based on an RS received from the downlink serving-eNB, to compensate for reversely-controlled-OLPC, multi-level P_SRS_offset(n) values may be semi-statically configured and one of the values may be applied to determine SRS transmission power.

Embodiment 2

According to Embodiment 2 of the present invention, as in a legacy LTE(-A) system, an eNB transmits only a single TA command to a UE and the UE accumulatively calculates/applies this command as single TA control. In this case, for uplink transmission in accordance with a specific condition, e.g., operation associated with a specific channel/signal or subframe set, or specific parameter(s) or DCI format(s), an uplink timing based on the single TA control may not be applied but the uplink timing may be determined by adding specific constant value(s) to the uplink timing based on the single TA control. For example, the specific constant value(s) may be previously provided through higher layer signaling, e.g., RRC signaling.

A description is now given of exemplary CoMP operation in a HetNet environment in which a downlink serving-eNB of a UE is a macro-eNB and reception point(s) are pico-eNB(s) which are geographically close to the UE. The UE may transmit uplink data/signals toward the downlink serving-eNB, i.e., the macro-eNB, by adjusting an uplink timing according to single TA control based on a single TA command received from the downlink serving-eNB as in a legacy operation (the uplink timing in this case is denoted by $t_{TA}$), and may operate to start specific uplink transmission of PUCCH/PUSCH/SRS toward a specific target reception point at an uplink timing calculated by adding one of time-based specific constant values (e.g., d(0), d(1), . . . ) previously provided through higher layer signaling, e.g, RRC signaling, to the $t_{TA}$ value (e.g., $t_{TA}$+d(0), $t_{TA}$+d(1), . . . ). The specific constant value(s) may be, for example, multiple(s) of $16*T_s$.

In addition, a variety of explicit/implicit indication schemes are also applicable. For example, after a plurality of specific constant values (e.g., d(0), d(1), . . . ) are semi-statically provided through higher layer signaling, a dynamic indication (e.g., a specific bit indication through specific DCI format(s) such as UL-related DCI format(s)) about which of the constant values d(0), d(1), . . . are actually applied for uplink transmission directed to the specific target reception point(s) may be given, a certain subframe restriction may be used to apply a specific value d(n) to a specific subframe set, or a linkage may be given per DCI format to apply a specific value d(n) when specific DCI format(s) are received.

2-1. Additional Embodiment

In Embodiment 2 described above, as an example of the operation associated with specific parameter(s), it may be predefined to apply a part of Embodiment 2 to a scrambling initialization parameter (e.g., a Virtual Cell Identifier (VCI)

replacing a legacy Physical layer Cell Identifier (PCI)) applied to each uplink transmission. That is, TA=$t_{TA}$+d(n) may always be configured to be utilized as an uplink timing for uplink transmission using a specific VCI.

The above description is merely exemplary and the present invention should be understood and construed as including similar associations among various parameters and modifications thereof. That is, the predetermined specific constant value d(n) related to TA may be associated with a similar-characteristic parameter (e.g., VCI) appropriately for a situation and thus may be used to determine a corresponding uplink transmission timing.

2-2. Additional Embodiment

In Embodiment 2 described above, as an example of the operation associated with a specific subframe set, uplink transmission of PUCCH/PUSCH/SRS may be directed to a victim cell (e.g., a pico-cell) only in subframes configured as Almost Blank Subframes (ABSs) or reduced power ABSs (r-ABSs) in the case of enhanced Inter Cell Interference Coordination (eICIC), and it may be predefined to apply a part of Embodiment 2 to this specific subframe set. That is, TA=$t_{TA}$+d(n) may always be configured to be utilized as an uplink timing for uplink transmission in subframes configured as ABSs or r-ABSs.

2-3. Additional Embodiment

In Embodiment 2 described above, the d(n) value may be associated with specific power control parameter(s). For example, a plurality of P_SRS_offset values, e.g., P_SRS_offset(0), P_SRS_offset(1), . . . , may be configured for SRS power control. When a macro-eNB is a downlink serving-eNB, since Open-Loop Power Control (OLPC) of pico cell-target PUSCH power control can be performed based on an RS received from the downlink serving-eNB, to compensate for reversely-controlled-OLPC, multi-level P_SRS_offset(n) values may be semi-statically configured and one of the values may be applied to determine SRS transmission power.

Similarly, the predetermined specific constant value d(n) related to TA may also be configured as multi-level values and d(n') may be configured to be used when P_SRS_offset (n') is applied to index n'. Since both P_SRS_offset(n) and d(n) are generated in the HetNet communication environment illustrated in FIG. 6, the two parameters may be associated with each other. In other words, since there is similarity in that power control and timing error for uplink transmission directed to other target reception point(s) operating based on an RS received from the downlink serving-eNB are compensated using the multi-level constants P_SRS_offset(n) and d(n), respectively, the present invention proposes to associate the two parameters with each other.

The above description is merely exemplary and the present invention should be understood and construed as including similar associations among various parameters and modifications thereof. That is, the predetermined specific constant value d(n) related to TA may be associated with a similar-characteristic parameter (e.g., VCI or P_SRS_offset (n)) appropriately for a situation and thus may be used to determine a corresponding uplink transmission timing.

Embodiment 3

In all of the methods described above in Embodiment 1 and/or Embodiment 2, at least a part of Embodiment 1 and/or Embodiment 2 may be started from a timing when specific activation message(s) is successfully transmitted through specific higher layer signaling (e.g., RRC signaling or MAC signaling) (or a timing delayed from the above timing by a predefined specific time).

That is, when a downlink serving-eNB and target reception point(s) for a specific UE are configured as the same eNB or RRH, i.e., when DL transmission and UL transmission are directed to one eNB or RRH, the methods described above in Embodiments 1 and 2 do not need to be applied and uplink timing adjustment based on single TA control as in a legacy method may be more effective.

However, if the downlink serving-eNB is still a macro-eNB but the UE moves such that the target reception point(s) are configured as pico-eNB(s) located geographically closer to the UE, e.g., in the HetNet environment illustrated in FIG. 6, a plurality of TA controls are preferably used as in the methods described above in Embodiments 1 and 2.

Accordingly, a specific higher layer signal (e.g., RRC signal or MAC signal) indicating a timing from when a part of the methods described above in Embodiments 1 and 2 is applied may be transmitted to the UE based on information about the current environment of the UE or using another network-based management method, and thus the UE may start to perform a part of operations of the methods described above in Embodiments 1 and 2. For example, the information may be may include (specific RS based (e.g., CRS based or CSI-RS based)) RRM measurement report (e.g., RSRP measurement report) of the UE, specific information exchanging due to a DL or UL (or DL and UL) handover process, and variations in specific parameter(s) related to an uplink power control process, e.g., a plurality of constant power offset parameters or a plurality of power control process parameters.

In this operation, similarly, a specific higher layer signal (e.g., RRC signal or MAC signal) for inactivating a part of operations of the methods described above in Embodiments 1 and 2 may be transmitted to the UE and thus the UE may inactivate the part of the operations of the methods described above in Embodiments 1 and 2.

Figure 7:
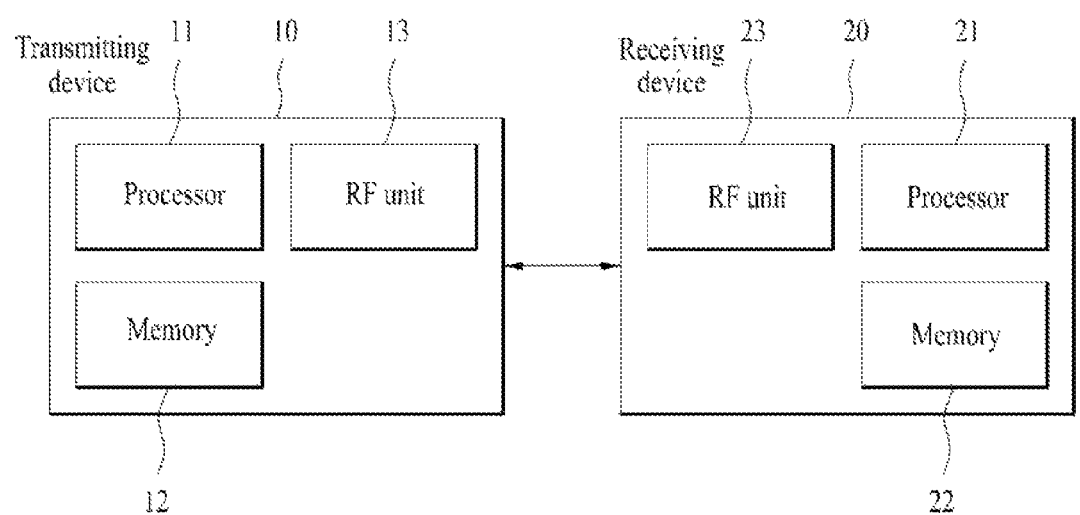
FIG. 7 is a block diagram of apparatuses capable of implementing an embodiment of the present invention.

FIG. 7 is a block diagram illustrating elements of a transmitting device 10 and a receiving device 20 for implementing the present invention. The transmitting device 10 and the receiving device 20 respectively include Radio Frequency (RF) units 13 and 23 capable of transmitting and receiving radio signals carrying information, data, signals, and/or messages, memories 12 and 22 for storing information related to communication in a wireless communication system, and processors 11 and 21 operationally connected to elements such as the RF units 13 and 23 and the memories 12 and 22 to control the elements and configured to control the memories 12 and 22 and/or the RF units 13 and 23 so that a corresponding device may perform at least one of the above-described embodiments of the present invention.

The memories 12 and 22 may store programs for processing and controlling the processors 11 and 21 and may temporarily store input/output information. The memories 12 and 22 may be used as buffers.

The processors 11 and 21 generally control the overall operation of various modules in the transmitting device and the receiving device. Especially, the processors 11 and 21 may perform various control functions to implement the present invention. The processors 11 and 21 may be referred to as controllers, microcontrollers, microprocessors, or microcomputers. The processors 11 and 21 may be implemented by hardware, firmware, software, or a combination thereof. In a hardware configuration, application specific integrated circuits (ASICs), digital signal processors (DSPs), digital signal processing devices (DSPDs), programmable logic devices (PLDs), or field programmable gate arrays (FPGAs) may be included in the processors 11 and 21. Meanwhile, if the present invention is implemented using firmware or software, the firmware or software may be configured to include modules, procedures, functions, etc. performing the functions or operations of the present invention. Firmware or software configured to perform the present invention may be included in the processors 11 and 21 or stored in the memories 12 and 22 so as to be driven by the processors 11 and 21.

The processor 11 of the transmitting device 10 performs predetermined coding and modulation for a signal and/or data scheduled to be transmitted to the outside by the processor 11 or a scheduler connected with the processor 11, and then transfers the coded and modulated data to the RF unit 13. For example, the processor 11 converts a data stream to be transmitted into K layers through demultiplexing, channel coding, scrambling, and modulation. The coded data stream is also referred to as a codeword and is equivalent to a transport block which is a data block provided by a MAC layer. One transport block (TB) is coded into one codeword and each codeword is transmitted to the receiving device in the form of one or more layers. For frequency up-conversion, the RF unit 13 may include an oscillator. The RF unit 13 may include $N_t$ (where $N_t$ is a positive integer) transmit antennas.

A signal processing process of the receiving device 20 is the reverse of the signal processing process of the transmitting device 10. Under control of the processor 21, the RF unit 23 of the receiving device 20 receives radio signals transmitted by the transmitting device 10. The RF unit 23 may include $N_r$ (where $N_r$ is a positive integer) receive antennas and frequency down-converts each signal received through receive antennas into a baseband signal. The processor 21 decodes and demodulates the radio signals received through the receive antennas and restores data that the transmitting device 10 intended to transmit.

The RF units 13 and 23 include one or more antennas. An antenna performs a function for transmitting signals processed by the RF units 13 and 23 to the exterior or receiving radio signals from the exterior to transfer the radio signals to the RF units 13 and 23. The antenna may also be called an antenna port. Each antenna may correspond to one physical antenna or may be configured by a combination of more than one physical antenna element. The signal transmitted from each antenna cannot be further deconstructed by the receiving device 20. An RS transmitted through a corresponding antenna defines an antenna from the view point of the receiving device 20 and enables the receiving device 20 to derive channel estimation for the antenna, irrespective of it represents a single radio channel from one physical antenna or a composite channel from a plurality of physical antenna elements including the antenna. That is, an antenna is defined such that a channel carrying a symbol of the antenna can be obtained from a channel carrying another symbol of the same antenna. An RF unit supporting a MIMO (multiple input multiple output) function of transmitting and receiving data using a plurality of antennas may be connected to two or more antennas.

In the embodiments of the present invention, a UE operates as the transmitting device 10 in UL and as the receiving device 20 in DL. In the embodiments of the present invention, an eNB operates as the receiving device 20 in UL and as the transmitting device 10 in DL.

The transmitting device and/or the receiving device may operate a combination of one or more embodiments described above with respect to figures.

As described above, the detailed description of the preferred embodiments of the present invention has been given to enable those skilled in the art to implement and practice the invention. Although the invention has been described with reference to exemplary embodiments, those skilled in the art will appreciate that various modifications and variations can be made in the present invention without departing from the spirit or scope of the invention described in the appended claims. Accordingly, the invention should not be limited to the specific embodiments described herein, but should be accorded the broadest scope consistent with the principles and novel features disclosed herein.

INDUSTRIAL APPLICABILITY

The present invention can be applied to a UE, an eNB, or other communication devices of the wireless communication system.

The invention claimed is:

1. A method for transmitting, by a user equipment (UE), an uplink (UL) signal in a wireless communication system, the method comprising:
   receiving only a single timing advance command from an eNB; and
   transmitting an UL signal using a single time advance value according to the single timing advance command or using one of a plurality of predefined timing advance values,
   wherein when the UE receives an activation message through a higher layer signaling, the UE transmits the UL signal using a specific timing advance value among the plurality of predefined timing advance values, wherein the specific timing advance value among the plurality of predefined timing advance values is indicated by a virtual cell identifier (VCI), and
   wherein when the UE does not receive the activation message or when the UE receives a deactivation message through the higher layer signaling, the UE transmits the UL signal using the single time advance value.

2. The method according to claim 1,
   wherein the specific timing advance value among the plurality of predefined timing advance values is dynamically indicated.

3. The method according to claim 1,
   wherein the specific timing advance value among the plurality of predefined timing advance values is indicated by a power control parameter.

4. User Equipment (UE) configured to transmit an uplink (UL) signal in a wireless communication system, the UE comprising:
   a Radio Frequency (RF) unit; and
   a processor configured to control the RF unit, wherein the processor is configured to:
   receive only a single timing advance command from an eNB, and
   transmit an UL signal using a single time advance value according to the single timing advance command or using one of a plurality of predefined timing advance values,
   wherein when the UE receives an activation message through a higher layer signaling, the UE transmits the UL signal using a specific timing advance value among the plurality of predefined timing advance values wherein the specific timing advance value among the plurality of predefined timing advance values is indicated by a virtual cell identifier (VCI), and wherein when the UE does not receive the activation message or when the UE receives a deactivation message through the higher layer signaling, the UE transmits the UL signal using the single time advance value.

5. The UE according to claim 4, wherein the specific timing advance value among the plurality of predefined timing advance values is dynamically indicated.

6. The UE according to claim 4, wherein the specific timing advance value among the plurality of predefined timing advance values is indicated by a power control parameter.

* * * * *